United States Patent Office 3,030,215
Patented Apr. 17, 1962

3,030,215
HOLLOW GLASS PARTICLES AND METHOD OF PRODUCING THE SAME
Franklin Veatch, Lyndhurst, Harvey E. Alford, Amherst, and Richard D. Croft, Wapakoneta, Ohio, assignors to The Standard Oil Company, Cleveland, Ohio, a corporation of Ohio
No Drawing. Original application Oct. 22, 1957, Ser. No. 691,726. Divided and this application Dec. 2, 1959, Ser. No. 862,436
4 Claims. (Cl. 106—40)

This invention relates to a method for preparing discrete, hollow spheres from a synthetic mixture of a siliceous material, a water-desensitizing agent, and a blowing agent by subjecting particles of this mixture to an elevated temperature for a time necessary to fuse the particles and cause expansion of the particles into unitary, hollow spheres and to the hollow spheres so formed.

Processes have been proposed heretofore for the preparation of hollow spheres generally similar to those produced by the process of this invention. In Patent No. 2,797,201, a method is disclosed for producing hollow spheres from a variety of film-forming materials by subdividing a liquid comprising a film-forming material and a latent gas material dissolved in a suitable solvent into fine droplets and then subjecting the droplets to a drying temperature at which the solvent is evaporated and the latent gas material is converted into a gas coincident with the formation of an outer skin of the film-forming material and to the evaporation of the solvent. The process of this invention is distinguished from the process of Patent No. 2,797,201 in that a solvent is not employed and the evaporation of the same is avoided. In the process of the invention, the film-forming material, initially in solid form, is fused.

Patent No. 2,676,892 discloses a method of producing hollow spheroids from naturally occurring argillaceous materials, such as clay. Here the material in powdered form is suspended in a hot gaseous medium and subjected to sufficiently high temperatures to expand the argillaceous particles. This process is dependent upon the characteristics of clay, both as to composition and size, and produces a product of poor uniformity, of relatively high density, and comprising particles of an uneven and irregular surface due to the high melting point of such clays. In the process of this invention, the material used, being synthetically prepared, is more uniform in size and composition and gives a uniform product comprising particles having a clear, smooth surface resulting from uniform fusion because of the lower temperature that can be used. The use of an incorporated blowing agent, rather than depending on what may be present in the clay, also gives a more uniform product.

It is therefore the object of this invention to provide a method for producing unitary, discrete, hollow, glass spheres from a synthetic siliceous material which has a controlled composition and size so the resulting expanded product will possess uniform composition and narrow and consistent physical properties, enabling its use in a wide field of commercial applications.

Furthermore, it is the object of this invention to produce a higher conversion of basic feed material to hollow particles and thereby yield a lower density product by uniformly introducing a chemical blowing agent which assists in the expansion of the particle.

It is a further object of this invention to improve the quality of hollow spheres produced by adding to the basic feed material an agent which will render the final product less sensitive to water. These agents can be selected to also lower the fusing temperature of the feed mixture, thereby effecting savings in heat requirements for the process.

The basic feed material in the invention is an alkali metal silicate. These are generally expressed by the formula $(Me_2O)_x \cdot (SiO_2)_y$. Various alkali metal silicates within the range where $x$ is 1 and $y$ is 0.5 to 5 and Me is an alkali metal, have been found satisfactory where one or a mixture of several metals have made up the alkali metal portion of the given ratio. However, for our process sodium silcate is a preferred material since it is a low cost raw material readily available from various commercial sources offering closely controlled specifications of very narrow limits. A typical example of a commercial sodium silicate used successfully in the process has the formula $Na_2O \cdot (SiO_2)_{3.22}$. The alkali metal silicate will be referred to hereinafter as the basic feed material in this process. It is convenient to use it initially as an aqueous solution or slurry having a silicate content of 35 to 50 percent. The amount of water is not critical since it is removed, as will be later described.

Hollow spheres produced from this feed material display uniform and consistent properties from one production lot to another, making them a dependable and useful product for commercial application. This same product uniformity is exceedingly more difficult to achieve when using naturally occurring materials as feed stocks where the composition of such materials may vary within considerable limits in the same deposit or in adjoining deposits. Processing and control methods to make such naturally occurring materials uniform usually make these materials more expensive as feed materials than the synthetic siliceous materials of the invention. It would be practically prohibitive to prepare a feed material from naturally occurring materials to the rigid specifications found in commercial grades of the preferred feed material.

Important in the process is the addition to the basic feed material of a silicate insolubilizing agent which renders the product more resistant to moisture. This agent can be selected from the oxides of metals and metalloids, such as oxides of zinc, aluminum, calcium, iron, boron, magnesium, or lead. Such oxide or oxides may be added directly to the feed material, or a precursor may be incorporated with the feed material which will readily decompose under heat to yield the desired oxide. The latter method may be accomplished by adding inorganic compounds such as carbonates or bicarbonates, i.e., calcium carbonate or bicarbonate, nitrates, halides, sulfates, hydroxides, such as aluminum hydroxide, wherein the desired metal is contained. The metal may also be in the negative radical, such as borates, i.e., borax, aluminates, such as potassium aluminate, etc. In such case, the alkali metal in the silicate may be correspondingly reduced. The use of such oxides or precursors is well known in the glass and ceramics industry, and any standard text in this field explains their function and the properties they impart in forming a water-insoluble glass-like composition upon fusion of the same with an alkali metal silicate. The amount of the water-desensitizing agent may vary depending on its composition and the degree of desensitization required. The above texts explain this. Generally, the amount will be 0.5 to 10% based on a 40% solution of sodium silicate. Generally, amounts from 1.5 to 6% are employed.

The composition considering the sodium silicate and the oxide should be selected as to ingredients and proportions as to give a molten glass mixture of high viscosity at a fairly low fusion temperature and of high surface tension. The word "glass" as used herein with reference to composition is intended to refer to the fusion product of an alkali metal silicate with an oxide, said product having an amorphous form (not necessarily transparent) insoluble in water and otherwise having the known properties of glass. The silicate and the oxide are referred to herein as glass-forming ingredients.

As previously stated, the addition of a blowing agent to the basic feed material has been found quite important in our process so that a uniform low density product may be produced. There are a large number of liquid and solid substances which liberate a gas at elevated temperatures.

Typical of these substances are salts selected from the group consisting of carbonates, nitrates, nitrites, azides, carbamates, oxalates, formates, benzoates, sulfates, sulfites, and bicarbonates such as sodium bicarbonate, sodium carbonate, ammonium carbonate, sodium nitrate, sodium nitrite, ammonium chloride, ammonium carbamate, ammonium bicarbonate, sodium sulfite, calcium oxalate, magnesium oxalate, sodium formate, ammonium benzoate, ammonium nitrite, zinc sulfate, zinc carbonate, aluminum sulfate, and aluminum nitrate. Typical of organic compounds are urea, dimethylol urea, biuret, melamine, trinitrotoluene, mellitic acid, glycerin, aniline p-sulfonic acid, trimethyl glycine, adipic acid, aminoquinoline, nitro aminobenzoic acid, nitro benzonitrile, 5-methylresorcinol, pentaglycerol, pyridine dicarboxylic acid, thiophene carboxylic acid, tetrabromoaniline, trihydroxyanthraquinone, and Carbowax 1000.

The amount of the blowing agent need not be large, and from 0.1 to 5% may be used. An amount of 0.5 to 2% is usually preferred, depending on its blowing ability. Too large amounts are to be avoided as they cause the bubble to burst and then collapse and fuse as a solid.

In general, it appears that the blowing agent should decompose to liberate a gas, at least in part at a temperature not appreciably removed from the fusion temperature of the particles. If the gas is liberated at too low a temperature, it is likely to be dissipated or become otherwise unavailable at the time when the particle fuses so that the particle will be solid. On the other hand, if a gas is not liberated at the fusion temperature, the particle will also be solid.

The three components of the feed composition should be intimately mixed by any known procedure and subdivided into small particles. One way of accomplishing this is to put the three components in a solution or slurry, dry and grind the same, and if necessary classify the ground particles.

In the operation of our process, it is preferred to introduce the feed mixture comprising the basic feed material, the blowing agent, and the water-desensitizing agent in particulate form as a dry or dry-appearing material, although not necessarily anhydrous, in a heated zone where the particle can be suspended in a hot gas and there fuse and blow.

Although many furnaces could be used for this process, such as the furnace disclosed in Patent No. 2,676,892, the preferred furnace is of the type disclosed in co-pending application Serial No. 691,725, filed of even date herewith. This furnace utilizes an updraft principle where the feed particles are introduced at or near the bottom of the furnace in an ascending column of hot gases. In such a furnace the particle settling rate in the gas is a balance of the buoyancy exerted on the particle by the upper velocity of the gas against the particle mass and volume or density. In this manner the particle receives heat in direct relationship to the requirements of heat necessary to fuse and expand it to a hollow sphere. By means of this furnace, it is possible to use a feed of wider particle size range, thereby reducing grinding and classifying costs appreciably.

The main process variables for a furnace of this type are temperature and particle residence time. The temperature is selected in accordance with the fusing temperature of the feed mixture. This temperature must be sufficiently high to melt the solid particles but maintained as low as possible to minimize costs and to make the process easier to control. Temperatures within the range of 1000° to 2500° F. can be used, depending on the feed stock and residence time.

The particle residence time in the furnace becomes primarily a function of feed particle size and the total flow of gases through the furnace. Accordingly, the residence time for any given size apparatus may be adjusted to an optimum for the particular feed mixture and particle size range by varying the total flow of gases through the furnace. The conditions are set on the furnace so the feed particles remain suspended in the hot region of the furnace for a time adequate to fuse and expand the particles to hollow spheres and are then carried upward in the ascending column of hot gases out of the high temperature zone of the furnace into levels of progressively lower temperatures so that the outer skin has time to substantially solidify so the particles will not rupture during product collection. The particles move out with the stream of gases into the cooler regions of the furnace to be collected either at the bottom of a chamber which surrounds the high temperature zone of the furnace, or the particles may remain in the ascending gases and pass overhead from the cooling zone in a separating zone where the particles are separated from the gases and collected. Residence times of 0.5 to 10 seconds are generally employed.

The following is the best mode contemplated for carrying out the invention.

The feed composition was made by forming a slurry of a sodium silicate solution containing 40% sodium silicate $Na_2O \cdot (SiO_2)_{3.22}$ to which had been added 5.6% boric acid and 1% urea, based on the sodium silicate solution. The slurry was stirred until uniform and spread out in pans one inch thick and dried in an oven at a temperature of 580° F. for 16 hours. The dried material had a moisture content of 3% and was ground and classified by screening, and the particles having a diameter of less than 250 microns were retained as feed material. These particles had an average diameter of 60 microns.

The feed material was fed into a vertical tubular furnace having an updraft flow as described in said copending application at a rate of 2 pounds per hour in a furnace having a diameter of 10 inches and a height of 32 inches. The temperature within the furnace was 2000° F. and the average residence time of the particles was 2 seconds.

The particles were collected after their exit from the top of the furnace and were found to vary in size from 10 to 350 microns with an average diameter of 100 microns and a gas density of 0.30 grams/ml. The walls of the particles were clear and transparent and free from bubbles. All of the particles were hollow and uniform in appearance and vary only as to size within the above range.

The invention is not limited to this preferred embodiment, and the effect of some of the significant variables will now be discussed.

It is generally desirable to reduce the water content of the feed mixture during the drying to not more than about 20% and preferably to about 3%. Higher water contents can be used but they are not economical due to the greater heat requirements in the furnace to volatilize the excess water. Table I demonstrates the effect that water content of the dry feed mixture has on product rating using the feed and conditions in the previous example.

TABLE I

*Effect of Water Content of Feed Material*

| Percent Water | Product Rating |
| --- | --- |
| 13.0 | 9 1 0 |
| 12.0 | 9 1 0 |
| 11.7 | 9 1 0 |
| 8.5 | 9 1 0 |
| 3.0 | 10 0 0 |

In order to assign a rating standard as a means of comparing the relative values of the products obtained at different moisture levels in Table I, aliquot samples were observed closely under a microscope and a numerical rating was assigned wherein the first digit of the number refers to the percent of the sample present as unitary hollow spheres, the second number refers to the percent of the sample as foamy particles, and the third number refers to the percent of the sample as solid bead particles. The digits total 10. For example, numerical rating 7 1 2 indicates that the sample examined was approximately 70 percent unitary hollow spheres, 10 percent foamy particles, and 20 percent solid beads. A rating of 10 0 0 indicates that the sample was 100 percent unitary hollow spheres. As may be seen in Table I, the best product rating is obtained with 3% moisture and consequently, due to this fact and the economic advantage mentioned previously, this moisture range is to be considered preferred for the practice of the invention. The same method of relative rating described above will be used hereinafter with test results and is intended to be interpreted in this manner.

The feed particle size can be varied between limits of from up to 2500 microns diameter, although for economic reasons particles up to 500 microns ordinarly would be used. The actual limits of feed particle size become dependent in great part upon the flexibility or range of operating conditions availble on the furnace used in the process. However, for any one particular run it will be highly advantageous to use a feed of as narrow a particle size range that grinding and classifying costs will permit. Otherwise, widely varying sizes of particles will require such highly different heat requirements for conversion to hollow spheres that it will be much more difficult to find optimum operating conditions on the furnace. Therefore, by use of a narrow particle size range a more uniform product can be obtained in higher yields. The specific particle size range to be used also will be determined in part by the properties desired in the ultimate product. Table II illustrates the effect of particle size range on product density under a given set of furnace conditions, i.e., those in the previous example.

TABLE II

*Effect of Feed Particle Size on Product Density*

| Size (microns) | Product Density (g./ml.) |
| --- | --- |
| Less than 53 | 0.81 |
| 53–74 | 0.41 |
| 74–149 | 0.26 |
| 149–250 | 0.26 |
| Less than 250 | 0.30 |

In the preferred example, above described, the silicate insolubilizing agent is boric acid.

Table III below lists several other silicate insolubilizing agents and demonstrates their effect, as compared with boric acid, in lowering the sensitivity of the glass spheres to moisture. The product rating for each type of agent is also given in Table III.

TABLE III

| Desensitizer Agent | Product Rating | Milli-equivalents of Acid per 100 ml. $H_2O$ |
| --- | --- | --- |
| None | 7 0 3 | 15.3 |
| 5.60% $H_3BO_3$ | 10 0 0 | 3.8 |
| 2.56% ZnO | 8 0 2 | 4.6 |
| 3.24% $Al_2O_3$ | 9 1 0 | 6.4 |
| 3.17% $CaCO_3$ | 2 2 6 | 3.4 |
| 1.58% MgO | 7 1 2 | 6.3 |

In acquiring the data relating to water sensitivity, a 10 gm. sample of product was obtained from an actual run as described above, except that each of the agents of Column 1 was employed in the percentages indicated with basic feed material. The sample was then deposited in 100 ml. of water, and after 165 hours the water was removed and titrated with standard hydrochloric acid to a phenolphthalein end point. The milli-equivalents of acid used to reach the end point gives a measure of the glass that actually dissolved in the water; and hence the higher milli-equivalents required, the higher the sensitivity of the product to water.

From Table III it is obvious that a number of agents are effective in making the product more resistant to moisture. However, boric acid is the preferred agent since it yields a product with the highest conversion of particles to hollow spheres.

When boric acid is used, the preferred amount is 1 to 10%, based on a 40% sodium silicate solution.

The fact that boric acid produces a product of superior visual properties in higher yields than the other metal oxides which are effective as desensitizing agents might be explained in part by the lower fusing temperature of the feed mixture that is effected when boric acid is supplied in the percentages specified above.

The lowering of fusing temperature aids most blowing agents, including the preferred ones, in their role of filling and aiding expansion of the hollow spheres since it approaches more closely the lower temperatures at which most blowing agents liberate their gas and thereby makes the time that the blowing agents liberate their gas more closely coincident with the time these gases can be utilized in filling the hollow spheres. Otherwise, the liberated gas will in part dissipate or become unstable on prolonged residence before it is utilized.

Of course, with lower fusing temperatures, a direct savings in operating cost can be appreciated since lower temperatures in the furnace can be employed. In addition, better control of the process can be realized with lower temperatures in the furnace and, therefore, there is less likelihood that feed particles will be overheated when they are held at the fusing point for the time required to expand the particle.

Furthermore, it is believed that the presence of boric acid tends to stabilize the viscosity of the feed mixture when it is at its fusing temperature. It has been observed that good spheres in high yields can be produced from a basic feed material over much wider temperature ranges with the addition of boric acid than can be achieved with addition of other desensitizing agents or with the basic feed material without any desensitizing agent. It is thought that without boric acid the viscosity of the feed mixture decreases with the increase of temperature; and as the particles fuse, the walls of many of the particles cannot contain the liberated gas, resulting in the particle rupturing. This effect is increased as the temperature range varies from conditions selected as optimum. On the other hand, the product produced with the presence of boric acid illustrates consistent yields of discrete, hollow particles with uniform walls when temperatures vary from the selected range. Obviously, this advantage with boric acid provides practical importance in the commercial operation of this process.

Boric oxide ($B_2O_3$) is the equivalent of boric acid and can be used instead by adjusting the amount according to the equation $B_2O_3 + 3H_2O \rightarrow 2H_3BO_3$. In the preferred example above, urea is used as the blowing agent. In Table IV below, several other blowing agents are listed and compared with urea in order of increasing decomposition temperature. Opposite each agent is the density of the product obtained when 1% of the respective agents was added to the feed mixture (based on the silicate solution) in the preferred example except for the change in blowing agent. A numerical rating as described heretofore is again assigned to the product obtained.

TABLE IV

*Effect of Chemical Blowing Agents*

| Blowing Agent | Decomposition Temp., °F. | Product Rating | Density, g./ml. |
| --- | --- | --- | --- |
| Urea | [1] 378 | 10 0 0 | 0.30 |
| $NaN_3$ | 572 | 7 2 1 | 0.67 |
| $MgCO_3$ | 662 | 7 3 0 | 0.73 |
| $FeSO_4$ | 896 | 10 0 0 | 0.53 |
| $Al_2(SO_4)_3$ | 1112–1472 | 9 1 0 | 1.05 |
| $ZnSO_4$ | 1412 | 10 0 0 | 0.41 |
| $Cu(NO_3)_2$ | 1472 | 10 0 0 | 0.54 |
| $Na_2CO_3$ | 2012 | 10 0 0 | 0.57 |
| $Al(NO_3)_3$ | | 10 0 0 | 0.72 |

[1] Decomposition temperature for Biuret.

As shown in Table IV, urea serves as an excellent blowing agent. It is believed that, notwithstanding its low initial decomposition temperature, other products are formed which may be more stable at higher temperatures than urea itself and are thereby effective to assist expanding the particle at high temperatures.

A further study was conducted on $Na_2CO_3$ blowing agent to determine what effect, if any, the variation of the respective agents may have on formation of product when added to a preferred feed mixture of sodium silicate and boric acid. These results are shown in Table V.

TABLE V

*Effect of Sodium Carbonate Concentration*

| Percent $Na_2CO_3$ | Product Rating | Product Density (Gas Density g./ml.) |
| --- | --- | --- |
| 0 | 9 1 0 | 1.08 |
| 0.1 | 10 0 0 | 0.68 |
| 1.0 | 10 0 0 | 0.57 |

As may be seen in Table V, if no sodium carbonate was added to the feed, a product with a gas density of 1.08 was obtained. This is too high for a desirable product. If only 0.1 percent sodium carbonate was added, a rating of 10 0 0 was obtained and a gas density of 0.68. The gas density of the product was decreased still further to 0.57 when the amount of sodium carbonate was increased to 1%. Further increases in the amount of blowing agent do not decrease the gas density of the product. Considering economics, it appears that an optimum in the amount of this blowing agent exists at about 1%.

A similar stud was made on urea and the results are shown in Table VI.

TABLE VI

*Effect of Urea Concentration*

| Percent Urea | Product Rating | Product Density (Gas Density g./ml.) |
| --- | --- | --- |
| 0 | 9 1 0 | 1.08 |
| 1.0 | 10 0 0 | 0.30 |
| 2.0 | 10 0 0 | 0.63 |

Similarly, from Table VI further evidence appears that an optimum in concentration of urea as a blowing agent has been found. When no urea was added, the density of the product was 1.08, which is too high for a desirable product. When 1% of urea was added, the gas density of the product was reduced to 0.30. The gas density was increased to 0.63 when 2% urea was added, and an inferior product was obtained if more urea was added to the mixture.

The spheres in the product produced in accordance with the invention may be varied in size depending upon the size of the feed particles, the amount of the blowing agent, the temperature, etc., as will be understood by one skilled in the art in view of the disclosure heretofore. In general, the particles will have a size within the range of 5 to 5000 microns, preferably 10 to 750 microns, since most uses contemplate the smaller sized particles. In the preferred range the average diameter may be 75 to 200 microns. A typical product, for instance, has particles within the size range of 10 to 350 microns with an average diameter of 100 microns.

The gas density of a mass of the spheres will vary depending somewhat on the density of the material from which they are formed, but mostly upon the relation of the volume of the spheres to the wall thickness. Gas densities in the range of 0.1 to 0.75 have been achieved in accordance with the invention. For most purposes, lower densities are desirable and densities in the range of .25 to .45 are preferred. In the very low densities, the spheres tend to be more fragile because of the thinness of the walls. Within the preferred range, the spheres have adequate strength for most uses.

The wall thickness is surprisingly thin. For instance, a sphere having a diameter of 350 microns and a gas density of 0.3 has a wall thickness of only 4 microns, which is only a little more than 1% of the diameter. In general, the wall thickness can be expressed as a percentage of the diameter of the spheres and will be about .5 to 10%, preferably about .75 to 1.5% in particles having a size of 10 to 500 micons.

The glass spheres produced in accordance with the invention have numerous uses and can in general be used for all of the purposes described in Patent No. 2,797,201.

For example, they may be used as loose insulation fill in refrigerators and other heat- and cold-retaining applications or may be cemented together in slabs for such use. They may be used as light-weight fillers for plastics, concrete, plaster, etc. They find special application as fillers for plastics, particularly the polyester, epoxy, polyamide, polyvinyl, and silicone plastics which are capable of outstandingly high temperatures and often subjected to high temperature applications. Because of the high melting point of these spheres and their water resistance, they find application for many uses, whereas spheres formed by plastics and analogous materials are not practical.

The glass spheres can be used as fillers for plastics with especially useful properties when it is desired that the plastics shall be uniformly filled. In such fill, plastics are to be contrasted with foamed-in-place plastics. When the foamed plastics are prepared, a blowing agent is incorporated in the plastics and the plastic is foamed and cured. The size of the holes in such foamed plastics is not uniform and they are not uniformly distributed. When the spheres of the invention are mixed with a plastic, the entire composition becomes homogeneous and uniform, which is important for many applications, particularly where electronic properties of such foams are important.

The spheres made in accordance with the invention impart particularly good compressive strength to resins filled therewith. As illustrative of their properties, the spheres made in accordance with the preferred example described heretofore were compared with "Perlite" and "Vermiculite" as a filler for an epoxy resin. The filled resins were made up employing an epoxy resin (Epon 815 obtained from Shell Chemical Company) mixed with 14 parts of metaphenylenediamine as a curing agent per 100 parts of the resin. The amount of filler in each instance was 33⅓%, and the mixture was cast in molds to form cylinders 1⅛ inches in diameter and 2¼ inches high and cured for five days at room temperature. The compression strengths are as follows:

*Compressive Strength in P.S.I.*

| Hollow Glass Spheres | "Perlite" | "Vermiculite" |
|---|---|---|
| 330 | 37 | 16 |

The glass spheres could be used as fillers in an amount up to 60% to give a compressive strength of the order of 500 p.s.i., whereas "Perlite" and "Vermiculite" in these concentrations gave compositions which were not even wet by the resin and showed no strength whatever. Only enough resin is required to wet the spheres and bind their surfaces together.

The hollow glass spheres of the invention serve as ideal fillers in comparison with conventional fillers, such as wood flour and calcium carbonate. Wood flour readily absorbs moisture, is attacked by micro-organisms, and is not fireproof—all undesirable properties not possessed by the spheres made in accordance with the invention. Calcium carbonate, which does not possess these disadvantages, is much heavier and, of course, gives the filled plastics a much greater density. These advantages and others will become more obvious from the following comparisons.

Table VII compares the density of a commercial polyester resin when filled with equal weight percents of hollow spheres, wood flour, and calcium carbonate. All the filled resins were cured at 190° F. in molds at 50 p.s.i. The catalyst system used a 50 percent benzoyl peroxide paste in tricresyl phosphate. The polyester resin used was Interchemical IC 312, a general-purpose resin. The same resin was used in all the results reported hereinafter.

TABLE VII

| Filler | gms. Filler—100 gms. Resin | Vol. percent Resin | Density gm./cc. |
|---|---|---|---|
| None | | 100 | 1.13 |
| Hollow Spheres | 10 | 74.5 | 0.93 |
| Wood Flour | 10 | 81.2 | 1.01 |
| CaCO₃ | 10 | 96.3 | 1.20 |
| Hollow Spheres | 25 | 68.7 | 0.97 |
| Wood Flour | 25 | 77.1 | 1.10 |
| CaCO₃ | 25 | 91.2 | 1.29 |
| Hollow Spheres | 50 | 36.9 | 0.62 |
| Wood Flour | 50 | 63.8 | 1.08 |
| CaCO₃ | 50 | 83.8 | 1.42 |
| Hollow Spheres | 100 | 22.6 | 0.51 |
| Wood Flour | 100 | 46.8 | 1.06 |
| CaCO₃ | 100 | 72.1 | 1.63 |

As is obvious from Table VII, the low particle density of the hollow glass spheres reduces the density of the polyester resin as the amount of filler is increased. Since the calcium carbonate has a high density, the density of the filled polyester resin increases rapidly as the amount of filler increases. Wood flour, which has a density of about 1 and nearly the same as the resin itself, exerts very little effect on the density of the filled polyester resin.

At a fixed volume percent of resin, the hollow glass spheres, due to their low density, exhibit a higher strength-to-weight ratio than either wood flour or calcium carbonate. This characteristic makes the product of the invention highly important to numerous commercial applications where weight is a controlling factor, such as in the aircraft industry.

A comparison of compressive strengths-to-weight ratio in specimens of filled polyester resins prepared with equal volume percent of filler using the same three fillers is given in Table VIII. All the strength determinations were made on a Tinius Olson Universal testing machine.

TABLE VIII

| Vol. Percent Filler | Compressive Strength-to-Weight Ratio $\frac{lbs./in.^2}{lbs./ft.^3}$ | | |
|---|---|---|---|
| | Hollow Spheres | Wood Flour | CaCO₃ |
| 20 | 7.2×10⁵ | 6.5×10⁵ | 5×10⁵ |
| 40 | 5.9×10⁵ | 4.8×10⁵ | 2.7×10⁵ |
| 60 | 4.1×10⁵ | 2.7×10⁵ | 1.2×10⁵ |

In some instances the ultimate compressive strength in pounds per square inch per cross section is not so important as the simple compressive load to cause failure of a specimen regardless of the cross sectional area. A test was therefore made to compare the compressive load at rupture of polyester resin containing hollow glass spheres, wood flour, and calcium carbonate as fillers. A specimen of resin containing each filler at a fixed volume percent was therefore prepared maintaining the weight and length of the specimen equal. Only the cross sectional area varied between the samples; and since the hollow spheres are much lower in density than the other fillers, the specimen containing them had the greatest cross sectional area. The specimen containing calcium carbonate had the smallest cross sectional area since this filler has the greatest density. Specimens in which the volume percent of the filler was fixed at 30% were subjected to a compressive load until the specimen ruptured. The following results were obtained:

Filler: Lbs. to Rupture
  Calcium Carbonate _____ 10,000
  Wood Flour _____ 14,000
  Hollow Spheres _____ 17,000

Table IX shows a comparison of tensile strength-to-weight ratio at equal volume percent of filler in the filled polyester resin. Again, it is apparent that the hollow spheres are significantly better on this basis than either of the other two fillers.

TABLE IX

| Vol. Percent Filler | Tensile Strength-to-Weight Ratio $\frac{lbs./in.^2}{lbs./ft.^3}$ | | |
|---|---|---|---|
| | Hollow Spheres | Wood Flour | CaCO₃ |
| 20 | 15,500 | 14,500 | 11,000 |
| 40 | 11,000 | 8,500 | 5,000 |
| 60 | 6,500 | 4,000 | 1,900 |

Table X shows a comparison of the flexural strength-to-weight ratio at equal volume percent of filler in the filled polyester resin.

TABLE X

| Vol. Percent Filler | Flexural Strength-to-Weight Ratio $\frac{lbs./in.^2}{lbs./ft.^3}$ | | |
|---|---|---|---|
| | Hollow Spheres | Wood Flour | CaCO₃ |
| 20 | 21,000 | 19,000 | 15,000 |
| 40 | 17,500 | 14,500 | 8,000 |
| 60 | 15,000 | 9,500 | 4,000 |

In the above results there is no indication to what degree a beam prepared from these filled resins may bend before actual rupture of the beam may occur. As a practical matter, it is quite important to measure the rigidity of beams since if they bend too much, they cannot be used to support loads, even though their ultimate flexural strength is quite high.

Table XI, therefore, shows a comparison of beam rigidity when each of the three fillers is employed in polyester resin. This comparison is on the basis of an equal weight of filled resin wherein the length of the beam was held constant and the volume per cent of resin in each specimen was equal. Only the cross sectional area varies between the three specimens. These results show conclusively that the resin filled with hollow glass spheres provides the greater degree of beam rigidity.

TABLE XI

| Weight Ratio, filler/resin | Beam Stiffness (Deflection in Inches) | | |
|---|---|---|---|
| | Hollow Spheres | Wood Flour | CaCO$_3$ |
| 1/10 | 0.28 | 1.00 | 0.78 |
| 1/4 | 0.20 | 0.95 | 0.63 |
| 1/2 | 0.19 | 0.85 | 0.65 |

The above data is intended merely to show the suitability of the hollow glass spheres for one use; namely, as a filler for plastics, and the data is merely for comparison with known fillers. Other uses are indicated earlier and will occur to those skilled in the art in view of the properties of the hollow glass spheres disclosed herein.

This application is a divisional application of our application Serial No. 691,726, filed October 22, 1957.

We claim:

1. A mass of hollow, discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, said mass having a gas density of .1 to .75.

2. A mass of hollow, discrete spheres of synthetic, fused, water-insoluble, transparent boro-silicate glass, said hollow spheres having solid walls of the same density throughout, and clear, smooth surfaces, diameters of from 10 to 500 microns, an average diameter of from 75 to 150 microns, an average wall thickness of about .75 to 1.5% of their diameters, said mass having a gas density of .25 to .45.

3. Glass spheres of claim 1 in which the glass is a transparent boro-silicate glass.

4. Hollow spheres of claim 1 in which the glass is selected from the group consisting of a zinc-silicate glass, a magnesium silicate glass and an alumino-silicate glass.

References Cited in the file of this patent

UNITED STATES PATENTS

| 2,117,605 | Fowler | May 17, 1938 |
| 2,676,892 | McLaughlin | Apr. 27, 1954 |
| 2,797,201 | Veatch et al. | June 25, 1957 |

OTHER REFERENCES

Science News Letter, Oct. 18, 1952 (page 249).